(12) United States Patent
Hodgkinson et al.

(10) Patent No.: US 6,317,431 B1
(45) Date of Patent: Nov. 13, 2001

(54) ATM PARTIAL CUT-THROUGH

(75) Inventors: Terence G Hodgkinson, Suffolk; Alan W O'Neill, Ipswich, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,570

(22) PCT Filed: Jun. 20, 1997

(86) PCT No.: PCT/GB97/01681

§ 371 Date: Mar. 6, 1998

§ 102(e) Date: Mar. 6, 1998

(87) PCT Pub. No.: WO97/50276

PCT Pub. Date: Dec. 31, 1997

(30) Foreign Application Priority Data

Jun. 21, 1996 (GB) .................................................. 9613020

(51) Int. Cl.[7] ........................... H04L 12/28; H04L 12/56; H04J 3/22; H04J 3/24
(52) U.S. Cl. ........................... 370/395; 370/392; 370/397; 370/466; 370/468
(58) Field of Search .................................... 370/395, 392, 370/225, 256, 408, 409, 399, 466, 468, 469, 471, 478, 355, 254, 397, 401, 351

(56) References Cited

U.S. PATENT DOCUMENTS

| 5,432,777 | * | 7/1995 | Le Boudec et al. | 370/60 |
| 5,440,547 | * | 8/1995 | Easki et al. | 370/60 |
| 5,548,589 | * | 8/1996 | Jeon et al. | 370/60.1 |
| 5,764,645 | * | 6/1998 | Bernet et al. | 370/466 |
| 5,835,710 | * | 11/1998 | Nagami et al. | 395/200.8 |
| 5,872,773 | * | 2/1999 | Katzela et al. | 370/256 |
| 5,903,559 | * | 5/1999 | Acharya et al. | 370/55 |

* cited by examiner

*Primary Examiner*—Wellington Chin
*Assistant Examiner*—M. Phan
(74) *Attorney, Agent, or Firm*—Nixon & Vanderhye, P.C.

(57) ABSTRACT

A method of transmitting across an ATM network a connectionless datagram in a cell structure having the form of a plurality of ATM cells the first cell of which carries in its payload the routing information of the connectionless datagram, and wherein at an intermediate node of the network a connectionless routing function is carried out on said first cell with the remaining cells remaining in the ATM layer.

10 Claims, 5 Drawing Sheets

| V | HL | ST | TL ||
|---|----|----|----|---|
| Id ||| FB | FO |
| TtL || Pr | HC ||
| SIPA ||||| 
| OIPA |||||
| 0 |||| P |
| IPOP |||||

FIG. 7

| V | P | FL |||
|---|---|----|---|---|
| PL ||| Py | HL |
| SIPA |||||
| SIPA |||||
| SIPA |||||
| SIPA |||||
| OIPA |||||
| OIPA |||||
| OIPA |||||
| OIPA |||||
| IPOP |||||

FIG. 8

| VPI | | VCI | | PT | CLP |
|---|---|---|---|---|---|
| HEC | | | | | |
| V | HL | ST | TL | | |
| Id | | | FB | FO | |
| TtL | | Pr | HC | | |
| SIPA | | | | | |
| DIPA | | | | | |
| PCRC | | | O | P | |
| IPOP | | | | | |
| IPOP | | | | | |
| IPOP | | | | | |
| IPOP | | | | | |
| IPOP | | | | | |
| IPOP | | | | | |

FIG. 9

| VPI | | VCI | | PT | CLP |
|---|---|---|---|---|---|
| HEC | | | | | |
| V | P | FL | | | |
| PL | | | Pr | HL | |
| SIPA | | | | | |
| SIPA | | | | | |
| SIPA | | | | | |
| SIPA | | | | | |
| DIPA | | | | | |
| DIPA | | | | | |
| DIPA | | | | | |
| DIPA | | | | | |
| PCRC | | | P | | |
| IPOP | | | | | |

ATM PARTIAL CUT-THROUGH

BACKGROUND OF THE INVENTION

The present invention concerns transmission of data over networks.

The most traditional network is the telephone network. The arrival of ISDN has greatly enhanced the capabilities of telephony and in particular the bandwidth available to users. Telecommunication networks such as telephony, FR (Frame Relay) and x25 are what is know as "connection-oriented." Thus prior to sending information across a connection-oriented network a user must be allocated a circuit either by provision or demand. Once this has been achieved the user can then send and receive information across the network between host machines.

In parallel with the arrival of broadband telephony there has been a very substantial growth in what are known as "connectionless" networks. Connectionless networks encompass LANs but in particular the most significant connectionless network is the Internet.

In a connectionless network a user does not have to obtain a circuit connection with a desired destination prior to sending the information across the network. This is because information is sent in datagrams which contain header field information which intermediate nodes use for routing purposes. There are a number of data networking protocols which have been designed for connectionless network paradigms. These include the Internet Protocol (IP), SNA (Systems Network Architecture), Appletalk and IPX and all transport data in the form of datagrams. Such datagrams will hereinafter be referred to as connectionless datagrams.

In addition to the above two basic types of network, the arrival of broadband networks heralded by the introduction of optical fibres has substantially increased the range and nature of data which can be transmitted over telephone lines. Thus while some users may be content with merely maintaining voice connections at constant bit rates other users might wish to have access to other connection types such as video and data at variable bit rates. Thus users now require the ability to select from a number of connection types in accordance with their needs. What are known as ATM (Asynchronous Transfer Mode) networks have been developed to meet this demand. In a typical ATM network a user can choose between a plurality of potential connection types, for example a fixed rate voice link, a variable bandwidth link peaking at 10 megabits and with a mean of 5 megabits, and a third variable bandwidth link peaking at 20 megabits and having a mean of 8 megabits. The second of these connection types can be used for high speed data transfer and the third for the transmission of video images.

In order to maximise the potential bandwidth available to users the telecommunications industry has developed what are known as virtual path (VP) networks. VP networks differ in two ways from the traditional telephone network already described. In a VP network each user is allocated a bandwidth appropriate to his assumed needs in the various connection types and the ATM network management provide bandwidth by selecting a route from all of the available paths in the network. It will be appreciated that it would be uneconomic to provide each user all the time with all the maximum bandwidth that that user might require. Accordingly, in a VP network the sum of the nominal bandwidths allocated to the users connected in the network is substantially greater than the total bandwidth of the network.

Thus, ATM networks provide a high speed technology that is likely to become fundamental in telephony because of its multi service capabilities. However, ATM still has difficulty in supporting traffic which is based on the connectionless paradigm of the Internet and other LAN-type networks.

SUMMARY OF THE INVENTION

In accordance with one aspect of the present invention there is provided a method of transmitting across a network a connectionless datagram in a packet structure having the form of a series of packets, the header including the routing information of the connectionless datagram being mapped into the payload of the first packet structure, and wherein at an intermediate node of the network a connectionless routing function is carried out on said first packet.

In accordance with a second aspect there is provided a switching node for a data network, the switching node comprising:

an ATM switch;

means for accepting a connectionless datagram and converting the datagram into a plurality of ATM cells in which header information in the connectionless datagram is inserted into the payload of the first cell of the ATM cell structure; and means for detecting the length of the header fields of the connectionless datagram and if the length of these fields is too great to be contained in the payload of the first cell of the ATM cell structure generating a partial header checksum and inserting this checksum into the payload of the first ATM cell together with only the header fields of the connectionless datagram up to and including the destination address.

In accordance with a third aspect there is provided a switching node for a data network, the switching node comprising:

an ATM switch;

means for accepting a connectionless datagram and converting the datagram into a plurality of ATM cells in which header information in the connectionless datagram is inserted into the payload of the first cell of the ATM cell structure; and means for detecting the length of the header fields of the connectionless datagram and if the length of these fields is too great to be contained in the payload of the first cell of the ATM cell structure generating a partial header checksum and inserting this checksum into the payload of the first ATM cell together with only the header fields of the connectionless datagram up to and including the destination address.

The present invention is also directed to a data network incorporating switching nodes as set out hereinbefore.

BRIEF DESCRIPTION OF THE DRAWINGS

In order that the present invention may be more readily understood an embodiment thereof will now be described by way of example and with reference to the accompanying drawings in which.

DETAILED DESCRIPTION OF THE INVENTION

Figure 1:
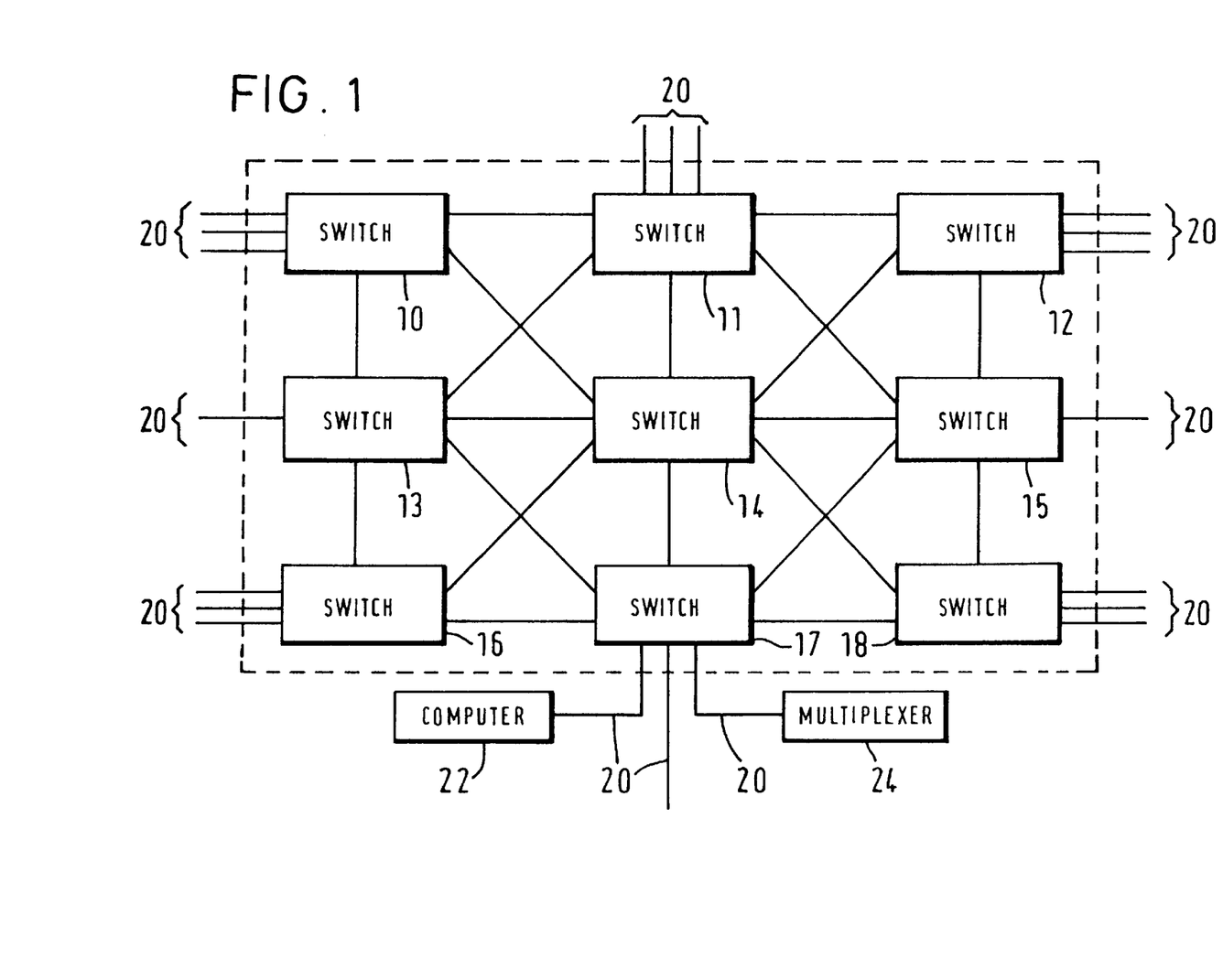
FIG. 1 shows a typical ATM network.

Referring now to FIG. 1 of the accompanying drawings, there is shown a block diagram of a conventional ATM network. The ATM network consists of a network of partially interconnected switching nodes in the form of ATM switches 10 to 18. Traffic in an ATM network consists of cells which are transmitted from node to node in the network. In the network of FIG. 1, switches 10, 11, 12, 13, 15, 16, 17 and 18 also function as access switches. Each of the access switches is connected to a set of access lines 20 which connect the switch to other networks or directly to customer equipment. By way of illustration, FIG. 1 shows switch 17 connected by one access line 20 to a computer 22 and by another access line 20 to a multiplexer 24. The computer 22 is provided with an ATM card which enables it to transmit and receive data in the form of ATM cells. The mulitplexer 24 can receive video, data and speech signals and convert these in a multiplexed manner into ATM cells. Likewise, it can receive ATM cells from the switch 17 and convert these to video, data and voice signals. Typically, the multiplexer 24 will be located at the premises of a user of the ATM network.

As is known to those skilled in the art, when transmitting an ATM cell between the ATM input interface and the ATM output interface, initial values are inserted into the virtual path identifier (VPI) and virtual channel identifier (VCI) fields in the header. The ATM input or output interface may be in an access node or outside the ATM network, for example in computer 22 or multiplexer 24. Then, at each switching node, the values of the VPI and/or VCI fields are read and one or both of the values are used together with a routing table to select an output port. Before the ATM cell leaves the switch, the values of one or both of the VPI and VCI fields are updated in accordance with data contained in a routing table. The VPI field provides a coarse level of routing whereas the VCI field provides a fine level of routing. The routing tables are set up partly by network management and partly during call set up. Mainly, but not entirely, virtual path routing tables are set up by network management and virtual channel routing tables are set up by signalling during call set up.

The structure of a basic ATM cell and the header fields will now be described.

Figure 2:
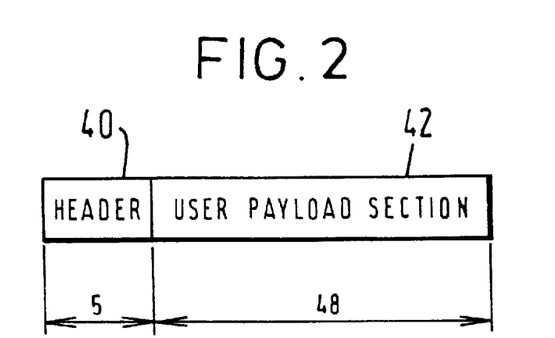
FIG. 2 shows a typical ATM cell.

Referring now to FIG. 2, a basic ATM cell comprises a five-octet header 40 and a 48-octet user payload section 42. The cell header 40 is used to route the cell between switches across the network and the user payload section 42 contains the user's data and it is carried transparently across the network and delivered unchanged at the far end. As will become apparent this basic cell is generally much smaller than a connectionless datagram.

Figure 3:
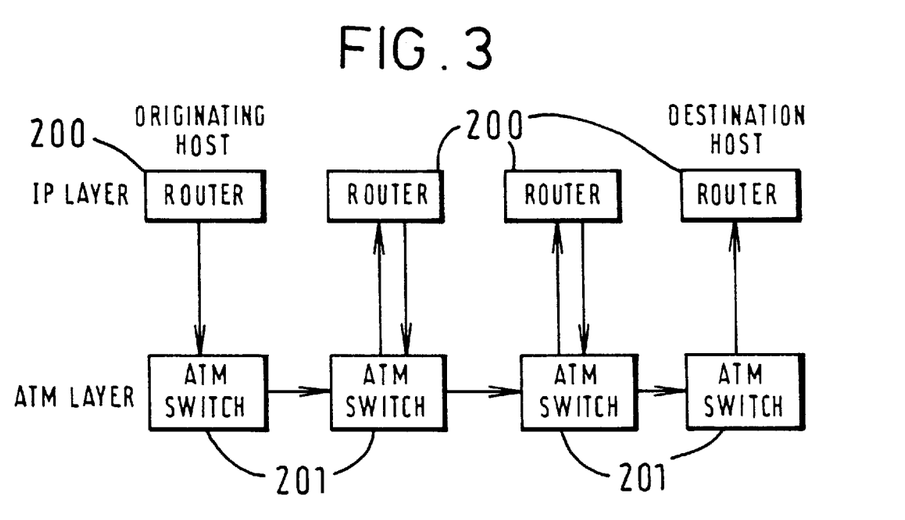
FIG. 3 is a diagram showing a known method of transporting IP over an ATM network.

Referring now to FIG. 3 of the drawings, this shows a network of IP routers 200 connected to ATM switches 201. The classic approach to supporting IP over ATM is to establish, at the ATM layer, a permanent virtual circuit (PVC), permanent virtual path (PVP) or switched virtual circuit (SVC) link between adjacent routers within a chain. Therefore, when the originating host sends a connectionless datagram to the destination host, ATM cells of the kind shown in FIG. 2 are used to transport the datagram information on a hop-by-hop basis between the intermediate nodes within the chain, the original datagram being segmented into a plurality of ATM cells when travelling between the ATM switches at the intermediate nodes. In this mode the ATM network is being used to provide leased line or LAN-to-LAN interconnect type services. In order to generate the ATM cells what is known as an ATM Adaptation Layer is used to decompose the IP datagram into ATM cells.

The problem with this approach is that at each of the nodes the original IP datagram has to be reassembled so that the IP router 200 at the intermediate node can utilise the header field information and then returned through the AAL layer for onward transmission by the ATM switch to the next node. As can be seen in FIG. 3 this involves using the IP layer router at the IP layer to determine the output port of the router which is to be used, and resegmenting the IP datagram into ATM cell format using an AAL process for onward transmission by the associated ATM switch. This approach has the drawback that the end-to-end delay increases with the number of intermediate nodes due to the time it takes for them to reassemble the IP datagram and resegment it into ATM cells. Accordingly this known approach involving IP over ATM is unsuitable for IP flows that have a short delay requirement and/or a long duration, and a direct connection between the two hosts may become preferable as this is more efficient in both end-to-end delay and network resource utilisation. Additionally, each of the IP routers 200 at the intermediate nodes in the chain has to buffer data which it does not directly need to process.

Pages 1409–1424 of Document Computer Networks and ISDN Systems, 1994, Vol. 26, No. 11, describe the above method of operation. In the method described in this document all connectionless datagram cells leave the ATM to undergo payload processing prior to being forwarded.

Figure 4:
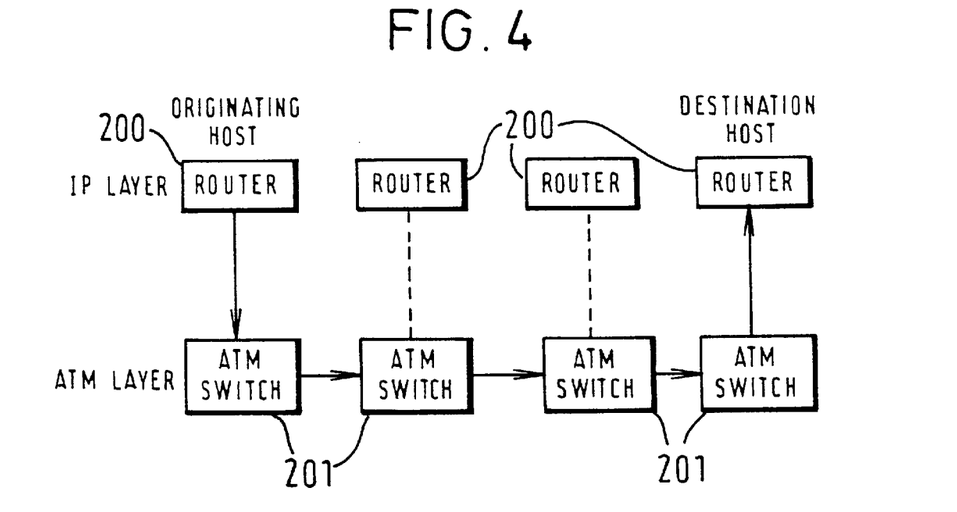
FIG. 4 is a similar diagram showing a method of achieving direct connection between originating and destination hosts.

FIG. 4 of the accompanying drawings shows an approach which has been proposed to meet the problems of the arrangement shown in FIG. 3. This approach is known as ATM cut-through and proposes the use of a direct connection over the ATM layer between the originating and destination hosts. It is achieved by providing a mapping between IP and ATM addresses. This mapping allows the originating host in FIG. 4 to discover the address of the ATM switch connected to the destination host and then to route all cells directly across the ATM network to this switch, thus bypassing all of the intermediate nodes. However, this approach still has problems. Firstly, it is not suited to all IP sessions. In particular, advantages of ATM cut-through are only realised where the IP sessions are of a suitably long duration for them to benefit from cut-through being applied. Additionally, after setting up a connection the datagrams are not sent to intermediate routers so router functionality such as re-routing, header error checking etc. become inaccessible. A third problem is that in order to achieve ATM cut-through mapping is required between the IP and ATM network addressing schemes. The result of this is that ATM cut-through is only useful for long-term sessions and does not address the requirements of shorter and increasingly higher data-rate sessions.

Figure 5:
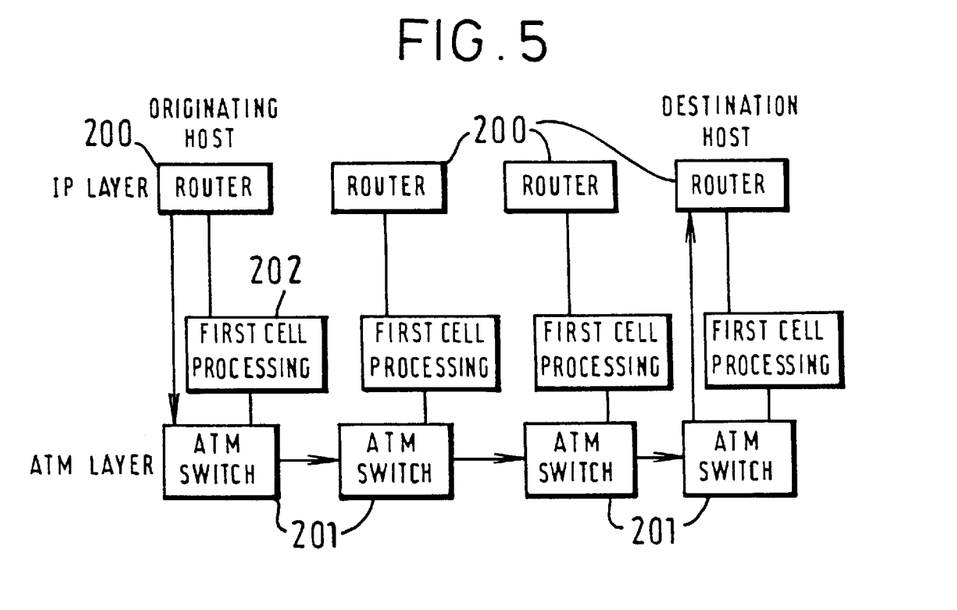
FIG. 5 is a similar diagram to FIGS. 3 and 4 showing a process of integrating connectionless datagram traffic and ATM in accordance with the present invention.

The problems of both of these known approaches are met in the system and method disclosed in FIG. 5 of the accompanying drawings. In order to distinguish the method of the present invention from the previously described methods, it will be referred to hereinafter as ATM partial cut-through.

As shown in FIG. 5, the ATM partial cut-through system occupies the middle ground between the two extremes of classic IP over ATM in which every intermediate node is fully involved, and ATM cut-through in which there is a direct mapping between host and destination. As seen in FIG. 5, each node consisting of an IP layer router 200 and an ATM switch 201 has an additional functionality provided at 202 which will be referred to hereinafter as first cell processing . Thus in the system shown in FIG. 5, when the originating host initiates an IP session in which data is to be sent to the destination host via datagrams, the ATM cell structure is arranged so that only the first cell of the structure derived from the original datagram carries routing information and all the cells following this first cell carry only the payload information of the original datagram. At each intermediate node the router at that node uses the first cell processing functionality to determine the route of the entire datagram as represented by the plurality of ATM cells whilst data forwarding of the ATM cells is left to the ATM layer (layer 2 or the data link layer of the OSI reference model). Thus based on the knowledge that the payload of the first ATM cell contains all of the relevant routing information within the IP header, it becomes possible by detecting the first cell and opening the payload to extract IP layer information which is capable of routing all of the ATM cells. This enables very efficient datagram forwarding as the datagram does not have to be reassembled and resegmented at each intermediate node and, as will be described later, also enables datagram discarding within the ATM layer.

In order to implement partial cut-through additional software and hardware functions will be needed to implement the "first cell processing features". These features include the identification of cells containing IP headers, the reading of the IP fields and the consequences of such reading, the buffering of the ATM cells containing the rest of the datagram, the calculation of the forwarding path and managing the forwarding process. However, this functionality does not affect standard ATM processes so it can be implemented within each ATM switch without affecting standard ATM VPI/VCI cell forwarding processes.

In accordance with the embodiment being described, the means for detecting the first cell of an IP datagram is provided by using one of the ATM Adaptation Layer (AAL) processes which have already been established for the transmission of IP data over an ATM network. Examples of these already existing AAL processes are AAL3/4 and AAL5.

Figure 6:
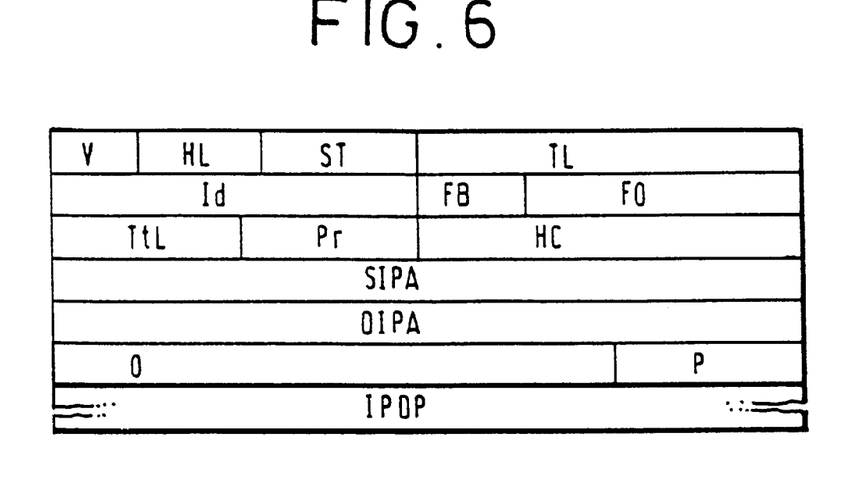
FIGS. 6 and 7 show protocols respectively for IP v 4 and IP v 6.

Referring now to FIG. 6 of the accompanying drawings, this figure represents a datagram having fields which conform with the IP v 4 protocol and in the figure the fields bounded by the bold lines constitute the IP datagram header. The key for the fields is set out in Table 1 below.

TABLE 1

| V | Version |
|---|---|
| HL | Head Length |
| ST | Service Type |
| TL | Total Length |
| Id | Identification |
| FB | Flag Bits |
| FO | Fragment Offset |
| TtL | Time to Live |
| Pr | Protocol |
| HC | Header Checksum |
| SIPA | Source IP Address |
| DIPA | Destination IP Address |
| O | Options (if any) |
| P | Padding (if any) |
| IP DP | IP Datagram Payload |

The payload of a typical connectionless diagram can be substantially larger than the payload capacity of an ATM cell. For example, the IP protocol allows payloads of up to approximately 65 kilobytes.

Figure 7:
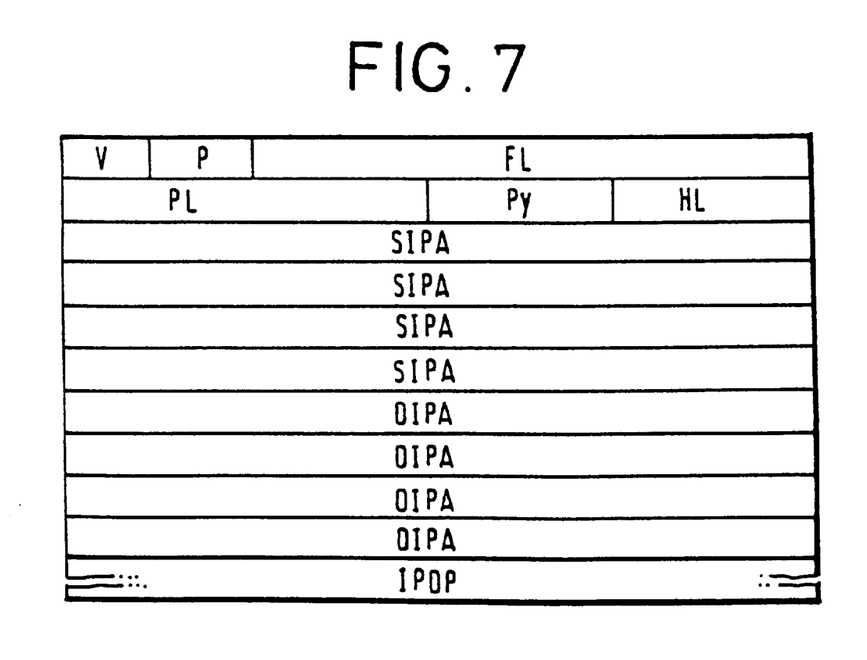

FIG. 7 of the drawings is a similar representation to FIG. 6 and shows a datagram having fields which correspond to the IP v 6 Protocol. Again the fields bounded by the bold line represent the IP Datagram header. Table 2 below sets out those fields which differ from the fields of FIG. 6.

TABLE 2

| Py | Priority |
|---|---|
| FL | Flow Label |
| HL | Hop Limit |

When a connectionless datagram, in the present embodiment an IP datagram, is processed at the AAL layer the variable length datagram is segmented into ATM cells of the kind described in FIG. 2. Thus the AAL layer will generate ATM cells of the kind shown in FIGS. 8 and 9. In these figures the bold lines encompass the ATM cell header. Other fields which are not common to the IP datagrams described with reference to FIG. 6 and 7 are set out in Table 3.

TABLE 3

Figure 8:
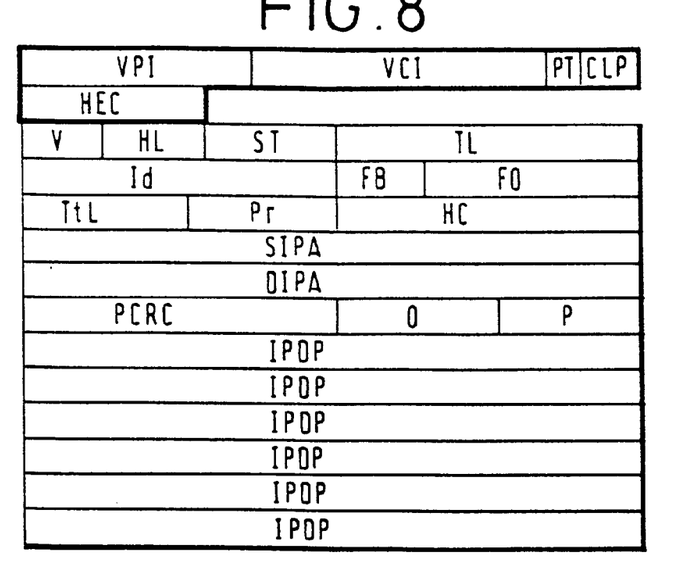
FIGS. 8 and 9 show ATM cells generated in accordance with the present invention.
Figure 9:
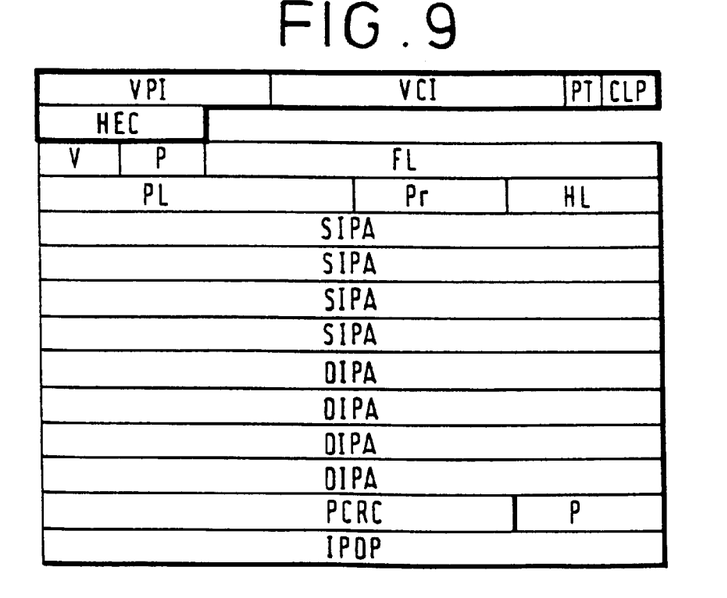

| VPI | Virtual Path Indicator |
|---|---|
| VCI | Virtual Circuit Indicator |
| PT | Payload Type |
| CLP | Cell Loss Priority |
| HEC | Header Error Check |
| PCRC | Partial Cylic Redundancy Code |

The cell shown in FIG. 8 is generated at the AAL layer from an IP v 4 datagram using AAL5. As already explained, an IP datagram and any other type of connectionless datagram is likely to be substantially larger than an ATM cell.

At the AAL layer the IP datagram is segmented into ATM cells of the kind described in FIG. 2 and as a result of this segmentation the header section of the IP datagram is inserted into the payload of the first ATM cell along, in many cases, with some of the payload, i.e. the first 48 octets of the IP datagram will become the payload of the first ATM cell, the second 48 octets of the IP datagram will become the payload of the second ATM cell and so on until the whole IP datagram has been converted into the ATM cell structure. Each ATM cell will, of course, have the appropriate ATM header as shown in bold lines.

The cell structure shown in FIG. 9 has been generated from an IP v 6 datagram also using AAL 5 and similar considerations apply.

In both cases it will be seen that the header of the IP datagram which includes all the IP routing information has been included within the payload of the first of the ATM cells generated at the AAL layer. As will also be appreciated, the information from the original IP datagram also contains a field which indicates the total length of the original datagram. Note that in this embodiment, the IP header does not include header options (IP v 4) or header extensions (IP v 6). These extend the size of the header such that they will not necessarily reside completely within the first cell of the ATM structure after the IP datagram has been processed at the AAL. For the purposes of partial cut-through, these options and extensions are therefore treated as part of the payload and, as in ATM cut-through, are not processed by the immediate routers.

Subsequent cells generated at the AAL layer are not shown as these cells will be conventional ATM cells with the 48 octet payload sections of the cells carrying the IP datagram payload.

Once the IP datagram has been converted into the ATM cell structure it will be transported from the first ATM switch shown in FIG. 5 to the first of the intermediate nodes. At this intermediate node the first cell of the ATM cell structure is subjected to the first cell processing function 202 at that node. This function will include the identification of cells containing IP header information, the reading of the IP fields, the calculation of the forwarding path and managing the forwarding process. This can be achieved by copying the IP header contents of the first of the ATM cells to the first cell processing function carrying out the recording process whilst buffering the ATM cells. It will thus be seen that when carrying out partial cut-through only the IP header information is processed at the IP layer. Consequently the additional first cell processing functionality carried out on the extracted IP header information has no effect on the standard ATM switching processes support from the requirements to buffer the following cells. As the first cell processing function has access to the length of the original datagram and this datagram, including the IP header information, has been broken into 48 octet segments, the first cell processing function will also know the number of ATM cells which had been generated at the AAL layer of the originating node. This has the result that the first cell processing functionality provides the ability to implement datagram discard at the ATM layer as it is possible to calculate the total number of cells arriving at the ATM switch and check whether or not there is sufficient spare buffer capacity to store all of the datagram's cells.

Another feature provided by the system shown in FIG. 5 is that error checking can be carried out at the intermediate node by the IP layer router. When ATM cut-through is applied, as in the system shown in FIG. 4, the IP header error check feature supported by IP v 4 is lost. However with ATM partial cut-through as shown in FIG. 5 the usual IP header error checking processes are preserved provided the first ATM cell contains all of the IP header information, including all options. This is necessary because the IP v 4 CRC check is across the header and all options, and some of these options could be in the second cell.

In certain circumstances this condition may be violated. Because of this the source and destination hosts shown in FIG. 5 may include a Service Specific Convergence Sub-layer (SSCS) process within the AAL to detect over-length headers, IP v 4 headers, or any request for the insertion of an optical CRC for the IP v 6 header. This CRC is optional because, unlike IP v 4, the IP v 6 header has no CRC of its own. Optional insertion of a CRC might be useful to detect header corruption within the ATM network so that the cells associated with the header corruption and carrying the payload of the complete datagram can be discarded. In such a case the SSCS process inserts a new CRC field into the original IP header. This new field is a partial header checksum calculated only for the IP header fields up to and including the destination address. When this new field is inserted into the IP header field it is placed immediately after the destination address field, as is shown in FIG. 8.

The processing that needs to be invoked by the originating host, intermediate nodes, and destination host when using ATM partial cut-through are listed below. Purely for illustrative purposes, it has been assumed that the SSCS process is being applied for both IP v 4 and IP v 6 using a standard AAL type. It is also being assumed that the availability of buffer space will be checked against the number of cells within each datagram and then either reserved or all of the cells discarded as necessary.

Originatinq Node
Receive IP datagram
Forward to AAL Processing
SSCS Part of Process

```
if IP CRC processing being used at intermediate nodes
then
    Read datagram Version field
    if IP v 6 then
        calculate partial_CRC
        insert partial_CRC field after destination
        address
    end
    if IP v 4 then
        if Header Length field > available payload
        space in the ATM cell then
            calculate partial_CRC
            insert partial_CRC field after
            destination address
        end
    end
end
ATM transmission
```

Intermediate Node
ATM reception
Identify first cell in datagram
Copy and forward payload from the first cell to the 'first cell processing' functionality
Read datagram Version field
While buffering incoming cells do

```
if IP v 6 then
    calculate number of cells in datagram using
    the Payload Length field
end
if IP v 4 then
    calculate number of cells in datagram using
    Header Length and Total Length fields
end
``` check whether or not sufficient buffer space is available to store the datagram's cells
if sufficient buffer space available then reserve buffer space
   if IP CRC processing being used at intermediated node then

```
            if IP v 6 then
                calculate partial_CRC for partial
                header
                compare with partial_CRC field
                contents
                    if compared CRC values are not
                    equal then
                        indicate datagram cells
                        are to be discarded
                    end
            end
            if IP v 4 then
                if Header Length field >
                available payload space within
                the ATM cell then
                    calculate partial_CRC for
                    partial header
                    compare with partial_CRC
                    field contents
                    if compared CRC values
                    are not equal then
                        indicate datagram
```

```
                    cells are to be
                        discarded
                end
            else
                calculate header checksum
                compare with Header
                Checksum field contents
                if compared Header
                Checksum values are not
                equal then
                    indicate datagram
                    cells are to be
                    discarded
                end
            end
        end
    end
    if IP CRC processing is not being used at
    intermediate nodes then
        indicate datagram cells are not to
        be discarded
    end
    if datagram cells are to be discarded then
        release buffer space reserved for the
        datagram's cells
        initiate discard of all received cells
        stored in the cache buffer
        discard all remaining cells associated
        with this datagram
    else
        Forward IP address information to routing
        function
        Read address
        Identify forwarding parameters (eg VPI,
        VCI and output port number)
        Switch all of the datagram's cells
        through the ATM switch
        ATM transmission
    end
end
if insufficient buffer space available then
    initiate discard of all received cells stored
    in the cache buffer
    discard all remaining cells associated with
    this datagram
end
end
```

Destination Node

ATM reception

Forward to AAL processing

SSCS Part of the AAL Process

```
if IP CRC processing being used at intermediate nodes
then
    Read datagram Version field
    if IP v 6 then
        remove partial_CRC field
    else
        if Header Length field > available payload
        space in the ATM cell then
            remove partial_CRC field
        end
    end
end
```

Forward datagram.

The system described as partial cut-through has a number of advantages over ATM cut-through.

Firstly the ATM switches are able to forward ATM cells based on IP addresses and routing information Secondly access to the IP datagram length information fields allows the ATM switch to check buffer resource availability and to apply a datagram discard policy at the ATM layer.

Thirdly access to IP header checksum information allows the ATM switch to discard immediately all of the datagram's cells if the header is errored.

Fourthly IP addresses are used to determine the route across the ATM network thus removing the need for an address resolution processes (ARP): consequently there is no requirement for IP to E164 address mappings.

Fifthly normal ATM processes are unaffected.

It may be appreciated that the invention may be used to transmit a connectionless datagram across a network as a series of packets. When using the invention to transmit a connectionless datagram in this manner, the header of the connectionless datagram is mapped into the payload of the first packet of the series of packets. At the intermediate nodes of the network, a connectionless routing function is carried out on the first packet of the series of packets and the remaining packets remain in the layer which corresponds to layer 2 (the data link layer) of the OSI reference model.

What is claimed is:

1. A method of transmitting a data-carrying datagram across a network in a connectionless manner, wherein the network has an input interface, an output interface, and a plurality of intermediate nodes for routing cells between the input interface and the output interface, each intermediate node being operable to route a cell in any one of a plurality of directions, and wherein the datagram has a header with routing information carried therein for routing the datagram, the method comprising the steps of, at the input interface of the network:

(a) decomposing the datagram into a cell structure having a series of cells, the series of cells including a first cell and at least on other cell, each cell in the series having a payload for storing data; and (b) mapping into the payload of the first cell at least part of the routing information carried in the header of the datagram, at least part of the data carried by the datagram being distributed into the payloads of the other cells(s):

and, at an intermediate node of the network:

(c) reading the routing information in the payload of the first cell; and (d) routing the first cell and the other cell(s) of the cell structure, the routing of the first cell and the routing of the other cell(s) being determined in response to the routing information read from the first cell, such that the first cell and the other cell(s) are routed along the same direction at the intermediate node.

2. A method as claimed in claim 1, wherein the cells are ATM cells, and the network is an ATM network, the network having an ATM layer for carrying the ATM cells, and a further layer in which routing information can be processed, and wherein the routing information in the first cell is processed in the further layer, and, on the basis of the processed routing information, a connectionless routing function is performed on the first cell, the other cell(s) remaining in the ATM layer.

3. A method according to claim 1, wherein the datagram is decomposed into an ATM cell structure by an AAL (ATM Adaptation Layer) process carried out at the originating node.

4. A method according to claim 1, including means for detecting the length of said cell structure, for reserving buffer space at the intermediate node, and for discarding the cells of the cell structure if the reserved space is insufficient to hold the entire cell structure.

5. A method according to claim 3, wherein at the or each intermediate node a datagram header error checking process is carried out on the payload of the first cell of said cells structure.

6. A method according to claim 1, wherein all the datagram cells are discarded at an intermediate node if an error in the datagram header is detected at that node.

7. A method according to claim 1, wherein at an originating node the length of the header is checked, and if this length is over a set value, a new partial CRC field is inserted into the original datagram header field, and at the or each intermediate node this partial CRC field is checked for errors.

8. A network for transmitting a data-carrying datagram in a connectionless manner, the datagram having a header with routing information therein, the network comprising: an input interface, an output interface, and a plurality of intermediate nodes for routing cells between the input interface and the output interface, each intermediate node being operable to route data in any one of a plurality of directions, wherein (a) the input interface is capable of: decomposing the datagram into a cell structure having a series of cells, the series of cells including a first cell and at least one other cell, each cell in the series having a payload for storing data; and, mapping into the payload of the first cell at least part of the routing information contained in the header of the datagram, at least part of the data carried by the datagram being distributed into the payloads of the other cells(s), and (b) at least one of the intermediate nodes is capable of: reading the routing information in the payload of the first cell; and, routing the first cell and the other cell(s) of the cell structure, the routing of the first cell and the routing of the other cells(s) being determined in response to the routing information read from the first cell, such that the first cell and the other cell(s) are routed along the same direction at the or each intermediate node.

9. A network as claimed in claim 8, the cells being ATM cells, and the network being an ATM network, the network having an ATM layer for carrying the ATM cells, and a further layer in which routing information can be processed, wherein processing means are provided for processing in the further layer the routing information of the first ATM cell, and wherein routing means responsive to the processed routing information are provided for performing a connectionless routing function on the first cell whilst the other cell(s) of the cell structure remain in the ATM layer.

10. A network according to claim 8 including means for discarding all the cells if the header routing information is faulty.

* * * * *